(12) United States Patent
Sai

(10) Patent No.: US 7,503,004 B2  
(45) Date of Patent: Mar. 10, 2009

(54) DISPLAY CONTROL METHOD AND DISPLAY CONTROL APPARATUS FOR LAYOUT IMAGE

(75) Inventor: Noriyuki Sai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 697 days.

(21) Appl. No.: 10/417,333

(22) Filed: Apr. 17, 2003

(65) Prior Publication Data

US 2004/0085331 A1     May 6, 2004

(30) Foreign Application Priority Data

Apr. 17, 2002 (JP) ............................ P2002-115079  
Apr. 16, 2003 (JP) ............................ P2003-112023

(51) Int. Cl.  
*G06F 3/00* (2006.01)

(52) U.S. Cl. ...................................................... 715/730

(58) Field of Classification Search .................. 715/716, 715/788, 838, 839, 738, 739, 730  
See application file for complete search history.

(56) References Cited

U.S. PATENT DOCUMENTS

| 6,747,648 | B2 * | 6/2004 | Hoehn et al. ................. 345/428 |
| 6,999,198 | B1 * | 2/2006 | Nakagiri et al. .............. 358/1.9 |
| 6,999,207 | B2 * | 2/2006 | Nakane ...................... 358/474 |
| 2003/0197894 | A1 * | 10/2003 | Miyamoto et al. ......... 358/1.18 |

FOREIGN PATENT DOCUMENTS

| JP | 10-079913 A | 3/1998 |
| JP | 10-293856   | 11/1998 |
| JP | 11-212536 A | 8/1999 |
| JP | 2000-050052 | 2/2000 |

* cited by examiner

*Primary Examiner*—Thanh T Vu  
(74) *Attorney, Agent, or Firm*—Sughrue Mion, PLLC

(57) ABSTRACT

A monitor display task displays a layout frame which is a layout position image for a print status image on the screen of a monitor. Then, the monitor display task displays the print status image in that portion on the screen which corresponds to the displayed layout frame. This can allow a user to quickly check the layout of the print status image.

8 Claims, 14 Drawing Sheets

54A {
[HEADER]
·
·
Information on Print Sheet
·
·
}

54B {
[PAGE]
DrawPicture (PhotoID1,-,,Upper Left X1, Upper Left Y1,
                         Lower Right X2, Lower Right Y2)
DrawPicture (PhotoID2,-,,Upper Left X3, Upper Left Y3,
                         Lower Right X4, Lower Right Y4)
DrawPicture (PhotoID3,-,,Upper Left X5, Upper Left Y5,
                         Lower Right X6, Lower Right Y6)
·
·
DrawFrame (Frame01,-,,Upper Left X1, Upper Left Y1,
                      Lower Right X2, Lower Right Y2)
·
·
}

DISPLAY CONTROL METHOD AND DISPLAY CONTROL APPARATUS FOR LAYOUT IMAGE

BACKGROUND OF THE INVENTION

The present invention relates to a display control method and display control apparatus for a layout image to display, for example, an image to be printed.

Generally, photographs taken by a digital camera are stored in a memory card as image data. Some printers read image data directly from the memory card and print the read image data without intervention of a personal computer. At the time of printing image data stored in a memory card using this type of printer, the memory card is inserted into a card slot of the printer. Then, image data to be printed is selected and the number of prints to be made is designated both through the operation panel of the printer, after which initiation of printing is instructed through the operation panel. The operation panel has a liquid crystal display section and a plurality of operation keys. By operating the operation keys while viewing the liquid crystal display section, a user selects image data to be printed, set the number of prints to be made and instruct the initiation of printing.

Another type of printer has a monitor (color liquid crystal display) capable of displaying an image to be printed or a print status image. This type of printer can allow a user to check the print status before printing without using a personal computer.

Recent digital cameras have the capability to store print attribute information in a memory card in addition to image data. The print attribute information includes the number of prints, the type and size of a sheet to be used in printing, and a layout to be adopted at the time of printing. The print attribute information is reflected on a print status image which is displayed on the monitor.

In the case where three pieces of image data are to be printed on a single sheet, for example, three print status images 81 based respectively on the three pieces of image data are displayed on a monitor screen 80 in the same layout as the layout included in the attribute information, as shown in FIG. 18. To display the print status images 81 on the screen 80, a preview display switch provided on the operation panel is to be depressed.

In general, the processing speed of a CPU (Central Processing Unit) which is used in a printer is however slower than the processing speed of a CPU which is used in a personal computer. It therefore normally takes several seconds (e.g., two to three seconds) for the print status images 81 to be displayed since the depression of the preview display switch. Even in the case where a user wants to check only the layout of the print status images 81, therefore, the user cannot give an instruction for another process until the display of the print status images 81 is completed.

In addition, every operation of the operation panel is disabled while the display of the print status images 81 is completed after the depression of the preview display switch. Even if the preview display switch is depressed erroneously, therefore, the user cannot instruct another process until the display of the print status images 81 is completed.

Japanese Laid-Open Patent Publication No. 10-79913 (pages 11 to 14 and FIGS. 31 and 32) discloses a method for displaying the thumb-nail image of a real image before displaying the actual image. The amount of data on a thumb-nail image is smaller than the amount of data on a real image. Therefore, the time needed to display a thumbnail image is shorter than the time needed to display a real image. This method can permit a user to check the layout of a real image, without waiting for the display of the real image to complete, at the point when the display of its thumb-nail image is completed. However, the time needed to display a thumb-nail image (about 0.5 second) is not short enough though shorter than the time needed to display a real image. That is, the user cannot check the layout of a real image in so short a time.

SUMMARY OF THE INVENTION

Accordingly, it is an object of the present invention to provide a display control method, display control apparatus and display control executing program which can ensure fast confirmation of the layout of an image to be displayed on a screen.

To achieve the object, the present invention provides a display control method of displaying an image on a screen of a monitor in accordance with a predetermined layout. The method comprises the stages of displaying a layout position image indicating a layout position of the image on the screen before displaying the image on the screen; and displaying the image in that portion of the screen which corresponds to the layout position image.

The present invention also provides another display control method of displaying an image on a screen of a monitor in accordance with a predetermined layout. The method comprises the stages of displaying a layout position image indicating a layout position of the image on the screen when an instruction to display the image on the screen is given through manipulation of an operation section; displaying the image in that portion of the screen which corresponds to the layout position image; interrupting a display process of the image when it is determined that the operation section has been manipulated during the display process of the image; and executing a process according to an instruction given through manipulation of the operation section during the display process of the image.

The present invention provides a further display control method of displaying an image on a screen of a monitor in accordance with a predetermined layout. The method comprises the stages of displaying a layout position image indicating a layout position of the image on the screen when an instruction to display the image on the screen is given through manipulation of an operation section; displaying the image in that portion of the screen which corresponds to the layout position image; and initiating a display process of a layout position image for an image different from the image when it is determined that the operation section has been manipulated after the layout position image was displayed.

In addition, the present invention provides a display control apparatus for displaying an image on a screen of a monitor in accordance with a predetermined layout. The apparatus comprises a control section for controlling display on the screen in such a way as to display a layout position image indicating a layout position of the image on the screen before displaying the image on the screen and then display the image in that portion of the screen which corresponds to the layout position image.

The present invention further provides a program for allowing a computer to perform a display control process of displaying an image on a screen of a monitor in accordance with a predetermined layout. The program allows the computer to execute the procedures of displaying a layout position image indicating a layout position of the image on the screen when an instruction to display the image on the screen is given via an operation section; displaying the image in that portion of the screen which corresponds to the layout position image;

interrupting a display process of the image when it is determined that the operation section has been manipulated during the display process of the image; and executing a process according to an instruction given through manipulation of the operation section during the display process of the image.

BRIEF DESCRIPTION OF THE DRAWINGS

The features of the present invention that are believed to be novel are set forth with particularity in the appended claims. The present invention, together with objects and advantages thereof, may best be understood by reference to the following description of the presently preferred embodiments together with the accompanying drawings.

DETAILED DESCRIPTION OF THE PREFERRED EMBODIMENTS

The first embodiment of the present invention will be described below with reference to FIGS. 1 to 14.

Figure 3:
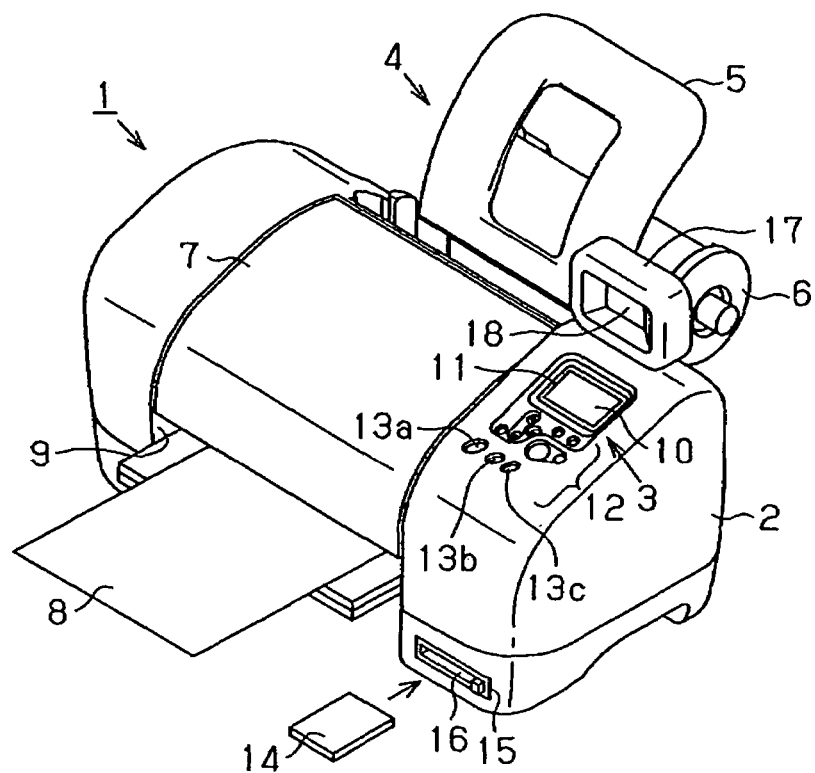
FIG. 3 is a perspective view showing a printer according to the first embodiment.

FIG. 3 is a perspective view showing a printer 1 according to the first embodiment. The printer 1 is an ink-jet type printer. The printer 1 has an automatic sheet feeding unit 4 at the back of a main body 2. The automatic sheet feeding unit 4 has a sheet feeder 5 and a roll paper support 6. The automatic sheet feeding unit 4 feeds single sheets, set on the sheet feeder 5, and a roll sheet, set on the roll paper support 6, into the main body 2. That is, the automatic sheet feeding unit 4 feeds a sheet 8 into the main body 2.

A print mechanism is mounted below a cover 7 provided in the center of the main body 2. The print mechanism prints on the sheet 8 supplied into the main body 2. The printed sheet 8 is discharged through a discharge port 9 provided in the front side of the main body 2.

An operation panel 3 is provided on the upper right portion of the main body 2. The operation panel 3 has a display unit 11 having a screen 10 and an operation section 12 including a plurality of operation switches (operation keys). The display unit 11 is a monochromatic liquid crystal display.

The display unit 11 displays a menu on print conditions on the screen 10 to allow a user to set the print conditions. In accordance with the menu displayed on the screen 10, the user, for example, selects the type and size of a sheet to be used at the time of printing, selects a layout to be taken at the time of printing or a print layout, selects image data to be printed and designates the number of prints to be made.

The operation section 12 has a power switch 13a which is depressed to power on the printer 1, a maintenance switch 13b which is depressed when an error occurs, and a roll-sheet switch 13c which is depressed to manipulate the roll sheet.

A read unit 15 having a card slot 16 is mounted on the printer 1. One of plural types of memory cards, such as a compact flash (R), smart medium (R) and memory stick (R), is loaded into the card slot 16 without using an adapter. The read unit 15 reads, from a memory card 14 placed in the card slot 16, image data and print attribute information stored in the memory card 14. Therefore, the printer 1 can print image data stored in the memory card 14 without being connected to a host computer like a personal computer. That is, the printer 1 is a stand-alone type printer.

A monitor 17 having a screen 18 is attached to the top portion of the main body 2. The monitor 17 displays a print status image on the screen 18. The user can check the print status before printing through the print status image displayed on the screen 18.

Figure 4:
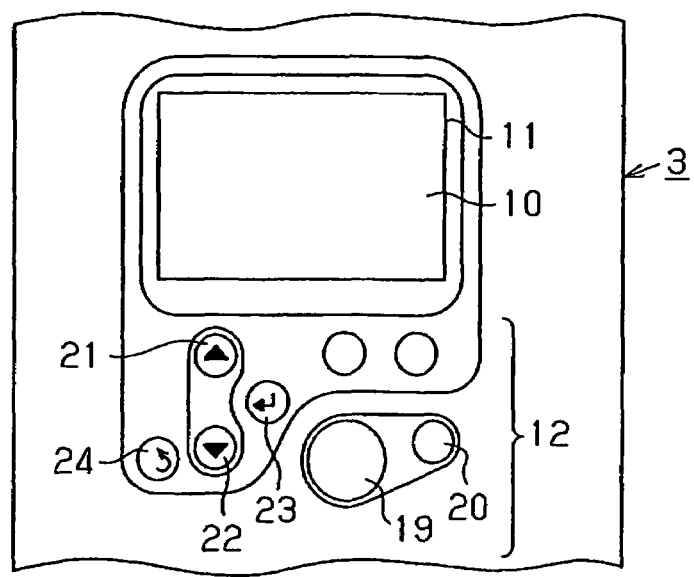
FIG. 4 is a plan view showing the essential portion of an operation panel provided on the printer shown in FIG. 3.

FIG. 4 is a plan view showing the essential portion of the operation panel 3. As shown in FIG. 4, the operation section 12 includes a print start switch 19, a cancel switch 20, select switches 21 and 22, a set switch 23 and a return switch 24 in addition to the switches 13a to 13c. The select switches 21 and 22 include an UP switch and DOWN switch.

The print start switch 19 is depressed to start printing. The cancel switch 20 is depressed to cancel printing in action or to cancel an input on the screen 10 of the display unit 11. The select switches 21 and 22 are depressed to move a cursor on the screen 10 and increase or decrease a value on the screen 10. The set switch 23 is depressed to move the display on the screen 10 forward and determine an input on the screen 10. The return switch 24 is depressed to return the screen 10 to the initial screen and return the display on the screen 10 to the previous display.

Figure 5:
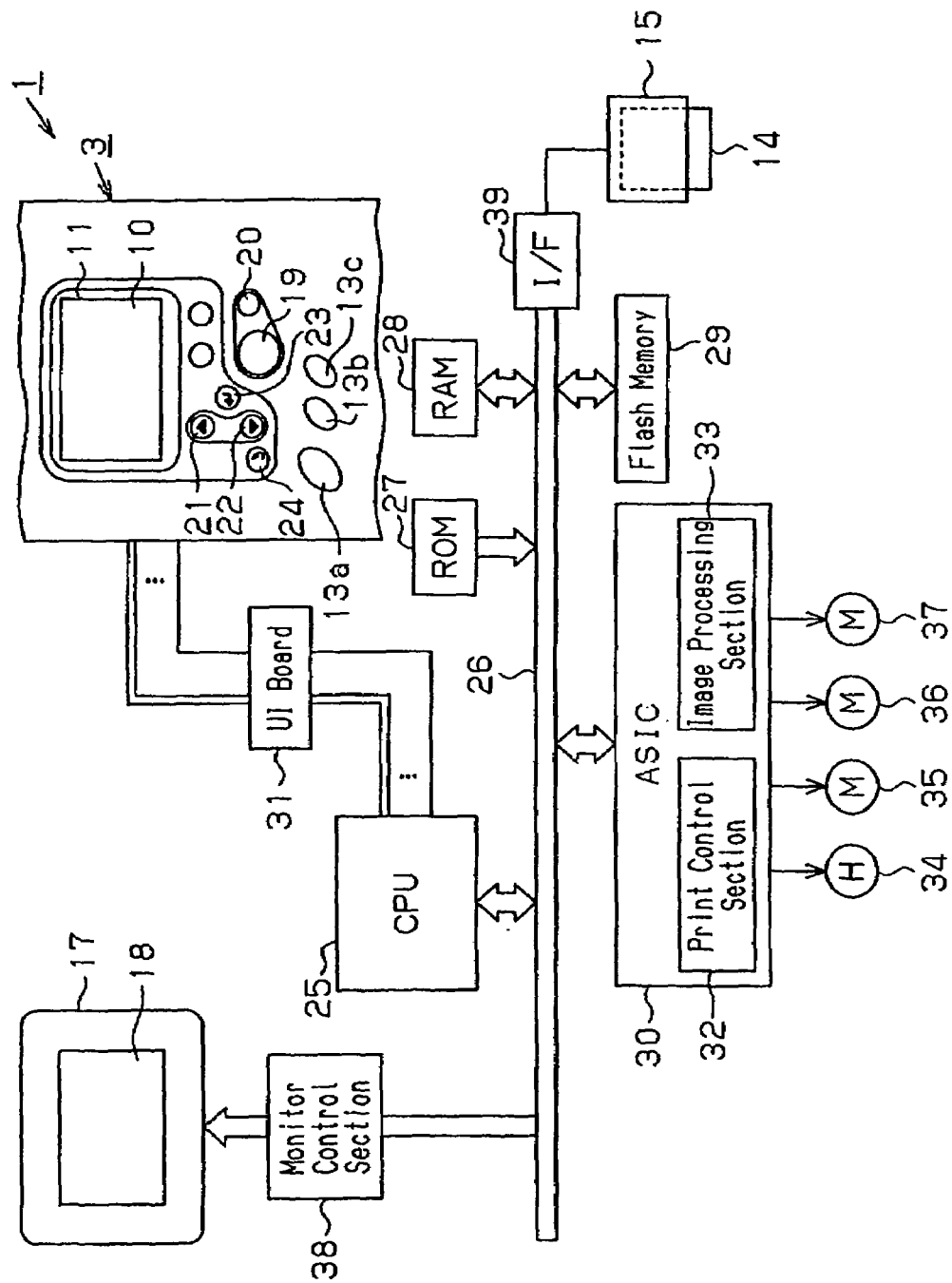
FIG. 5 is a block diagram illustrating the electric structure of the printer shown in FIG. 3.

FIG. 5 is a block diagram illustrating the electric structure of the printer 1. The printer 1 has a CPU 25 which is connected via a bus 26 to a ROM 27, RAM 28, flash memory (EEPROM) 29 and ASIC (Application Specific IC) 30.

What is stored in the ROM 27 includes a control program which is executed by the CPU 25 and data for displaying the menu on the screen 10. The control program includes a program to control the display on the display unit 11 and the monitor 17.

The RAM 28 stores print data which is transmitted from the host computer, image data which is read from the memory card 14 and various kinds of data that are generated in the process of converting the image data to print data. A part of the RAM 28 serves as a screen memory to save images to be displayed on the screen 18 of the monitor 17. In other words, the RAM 28 includes the screen memory.

The CPU 25 is connected to a user interface (UI) board 31 which controls the operation panel 3. The CPU 25 executes the control program stored in the ROM 27 to thereby control the display unit 11 via the UI board 31. The CPU 25 performs various operations, such as setting a print condition and instructing the start of printing, in accordance with operation signals from the switches 19 to 24.

The ASIC 30 controls printing based on a control signal and print data from the CPU 25. In this embodiment, the ASIC 30 has a print control section 32 and an image processing section 33.

The image processing section 33 converts RGB data of image data read from the memory card 14 to CMYK data. The image processing section 33, in cooperation with the CPU 25, executes a resolution conversion process, color conversion process and half-tone process of image data, and an interlace process (microwave process) to sort ink dot data of individual colors in consideration of the dot forming order. That is, the image processing section 33 converts image data read from the memory card 14 to print data.

The print control section 32 controls the operation of the print mechanism based on print data sent from the host computer or print data converted in the image processing section 33. The print mechanism includes a recording head 34, such as a piezoelectric head, a carriage motor 35, a sheet feeding motor 36 and a roll-sheet drive motor 37. The print control section 32 is electrically connected to the recording head 34, the carriage motor 35, the sheet feeding motor 36 and the roll-sheet drive motor 37.

The flash memory 29 stores a print condition set according to the menu, displayed on the screen 10 of the display unit 11, as print attribute information.

As shown in FIG. 5, the monitor 17 is connected to a monitor control section 38. The monitor control section 38 is connected to the read unit 15 via the bus 26 and an interface (I/F) 39. The monitor control section 38 displays, on the screen 18 of the monitor 17, print status images based on the image data and print attribute information read from the memory card 14 by the read unit 15.

Figure 2:
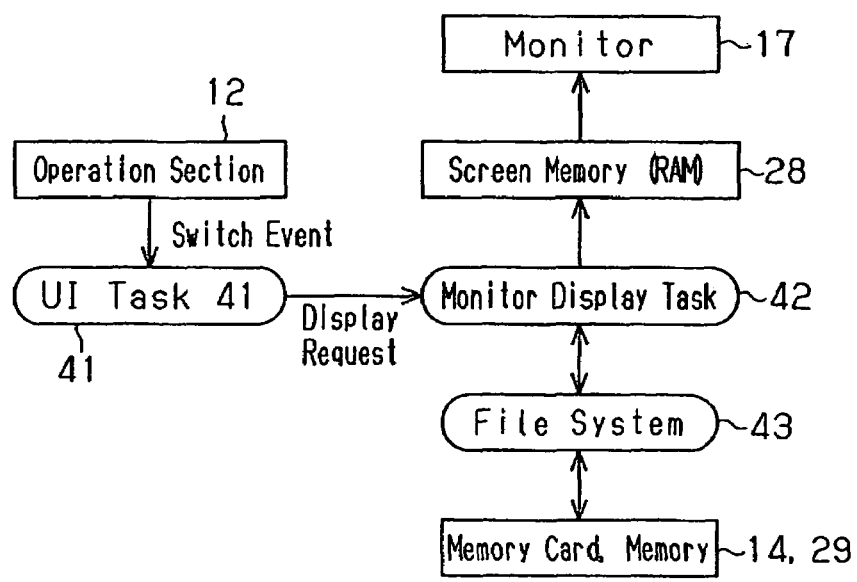
FIG. 2 is a schematic structural diagram of a preview display system according to the first embodiment.

FIG. 2 is a schematic structural diagram of a preview display system which executes a process of displaying print status images on the screen 18 of the monitor 17. In FIG. 2, hardware portions are shown in rectangular blocks, and software portions are shown in round-ended blocks. The software portions shown in FIG. 2, namely a UI (User Interface) task 41, a monitor display task 42 and a file system 43, are the functions the CPU 25 execute according to the program stored in the ROM 27.

The UI task 41 manages a user request through the operation section 12. When any of the switches 13a to 13c and 19 to 24 is depressed, i.e., the operation section 12 is manipulated, a switch event is sent to the UI task 41. The UI task 41 is invoked upon reception of the switch event. The invoked UI task 41 invokes or terminates a predetermined task (e.g., the monitor display task 42) in accordance with the depressed one of the switches 13a to 13c and 19 to 24, i.e., in accordance with the type of the received switch event.

The monitor display task 42 is invoked upon reception of a preview display request from the UI task 41. The preview display request is a message to be sent to the monitor display task 42 from the UI task 41 when the switch event received by the UI task 41 is a monitor display request event. The invoked monitor display task 42 reads image data corresponding to a print status image to be displayed on the screen 18 from the memory card 14 via the file system 43 and reads print attribute information associated with the image data from the memory card 14 or the flash memory 29. The file system 43 manages reading of image data from the memory card 14 and reading of print attribute information from the memory card 14 and the flash memory 29.

The monitor display task 42 acquires layout information relating to the layout of a print status image to be displayed from the print attribute information read via the file system 43 and generates layout display data based on the layout information. The monitor display task 42 also generates preview display data based on image data corresponding to a print status image to be displayed and the layout information. The generated layout display data and preview display data are written in the screen memory of the RAM 28. When writing the layout display data or the preview display data in the screen memory is completed, the monitor display task 42 sends a display request to the monitor control section 38.

Upon reception of the display request, the monitor control section 38 reads out the layout display data or the preview display data written in the screen memory. Then, the monitor control section 38 displays an image based on the read layout display data or preview display data on the screen 18 of the monitor 17. The image displayed based on the preview display data is the print status image. The image displayed based on the layout display data is the outer frame of that print status image or the layout frame. The layout frame is equivalent to a layout position image which indicates the layout position of the print status image.

Figure 1:
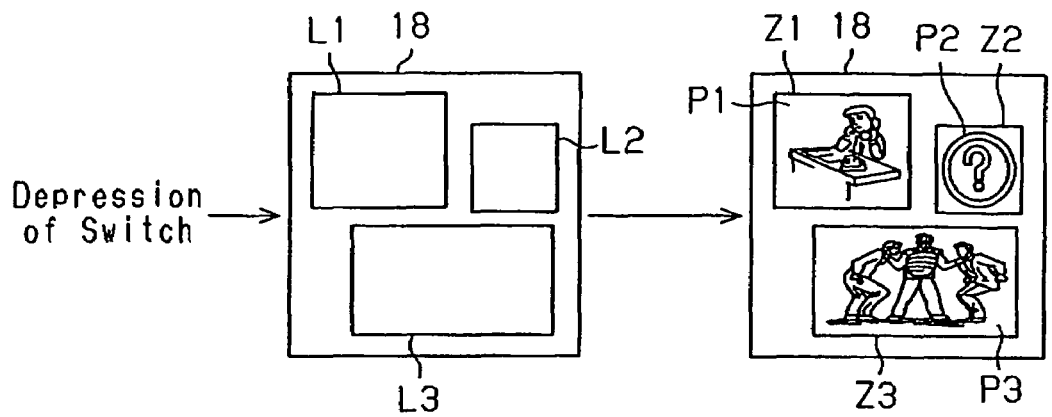
FIG. 1 is a diagram for explaining print status images to be displayed on the screen of a monitor according to a first embodiment of the present invention.

FIG. 1 is a diagram for explaining print status images to be displayed on the screen 18 of the monitor 17. Suppose that the user has done setting to print three pieces of image data, which respectively correspond to print status images P1, P2 and P3 shown at the right-hand portion in FIG. 1, on a single sheet. In this case, when having receiving the preview display request from the UI task 41, the monitor display task 42 first displays layout frames L1, L2 and L3 respectively corresponding to the three pieces of image data on the screen 18. Subsequently, the monitor display task 42 displays the print status images P1, P2 and P3 in portions Z1, Z2 and Z3 on the screen 18 where the layout frames L1, L2 and L3 are displayed.

The amounts of data on the layout frames L1, L2 and L3 are considerably small. Therefore, the display of layout frames L1, L2 and L3 is completed spontaneously (e.g., within several tens of milliseconds). By way of contrast, the amounts of data on the print status images P1, P2 and P3 are larger than the amounts of data on the layout frames L1, L2 and L3. Therefore, the time needed to display the print status images P1, P2 and P3 is longer than the time needed to display the layout frames L1, L2 and L3 and is several seconds (2 to 3 seconds).

Recent digital cameras have the capability to store print attribute information in the memory card 14 in addition to image data. The print attribute information that is to be stored in the memory card 14 includes, for example, the number of prints to be made, the type and size of a sheet to be used at the time of printing, and a print layout. The print attribute information is stored in the memory card 14 in accordance with, for example, the DPOF (Digital Print Order Format) standard.

Figure 6:
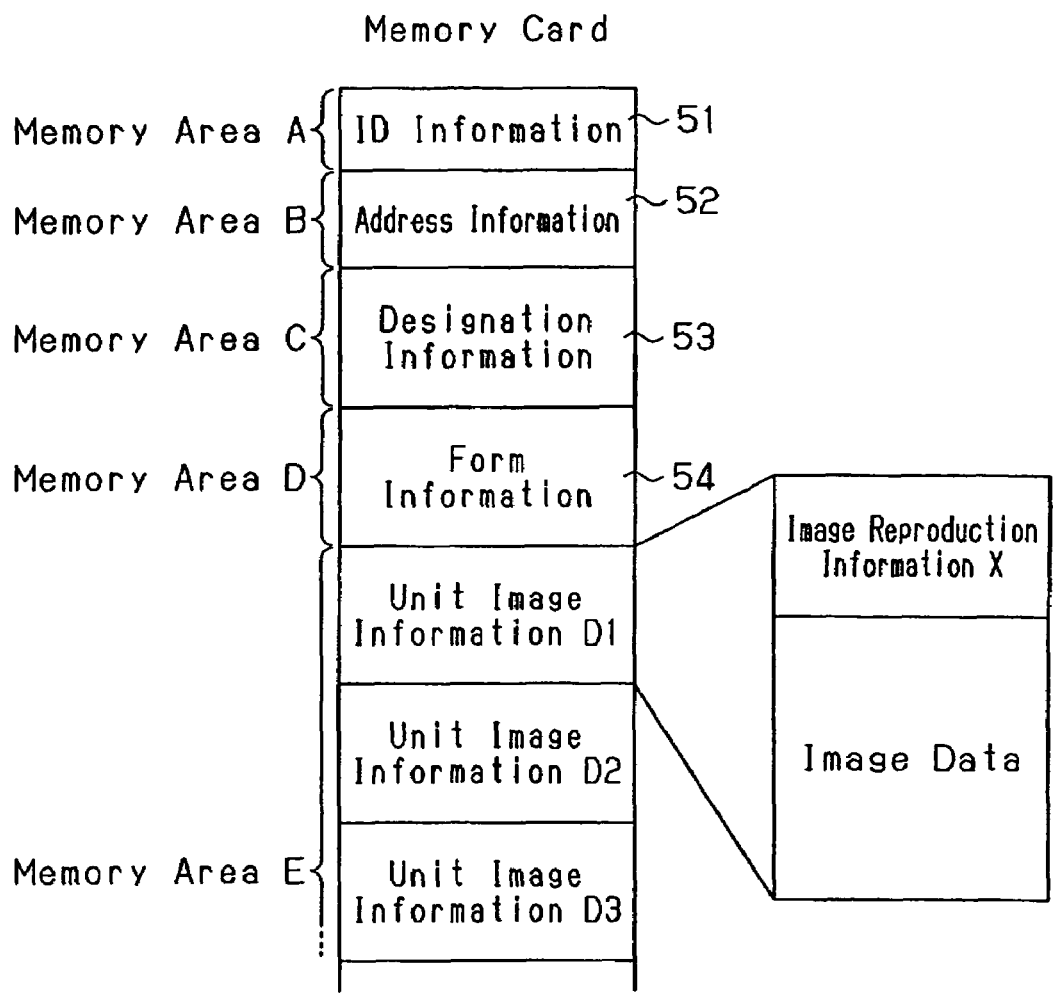
FIG. 6 is a diagram showing the memory map of a memory card.

FIG. 6 is a diagram showing the memory map of the memory card 14. The memory card 14 has a memory area A in which ID information 51 is to be stored, a memory area B in which address information 52 is to be stored, a memory area C in which designation information 53 is to be stored, a memory area D in which form information 54 is to be stored, and a memory area E in which unit image information $D_1$ to $D_n$ is to be stored.

The ID information 51 includes an identification (ID) code for identifying image data stored in the memory card 14. The address information 52 includes an address indicating an address range in which each image is written. The designation information 53 includes data indicating whether or not printing is required, the number of prints to be made and a mode (index or standard) which should be taken at the time of printing for each image data stored in the memory card 14, and a printing order, and is input by the user using a digital camera. The form information 54 defines the format of the image data stored in the memory card 14 and includes a print layout set by the user using a digital camera. Each of the unit image information $D_1$ to $D_n$ includes image reproduction information X and image data. The image reproduction information X includes information about the hue, brightness, sharpness and contrast, and is written when a photograph is taken by a digital camera. The image quality of image data is corrected based on the image reproduction information X at the time of printing.

Figure 7:
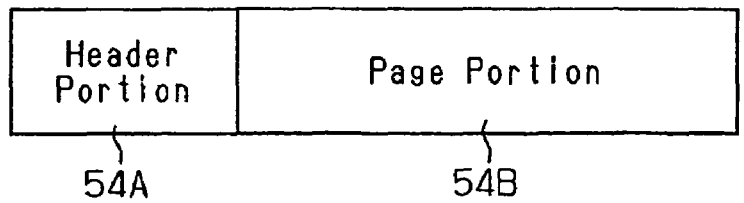
FIG. 7 is a diagram showing the data structure of form information.
Figures 8, 9:
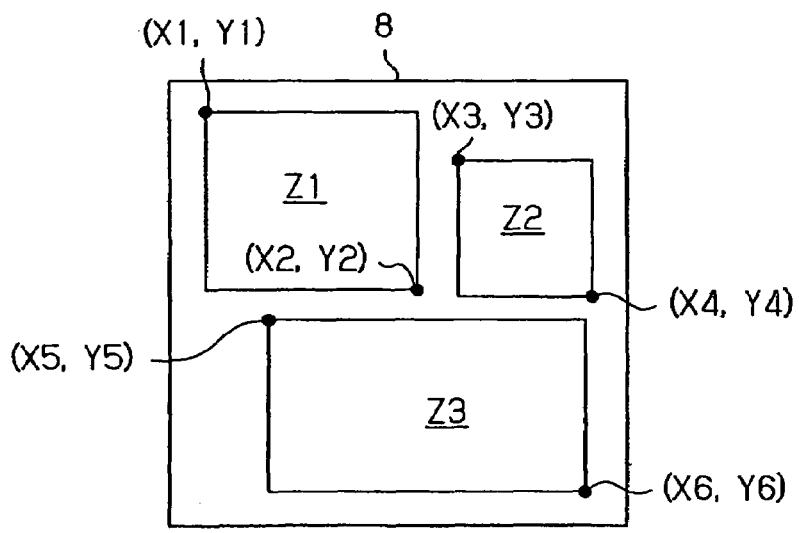
FIG. 8 is a diagram showing the file content of the form information.
FIG. 9 is a diagram showing a print layout according to the form information shown in FIG. 8.

The form information 54 is comprised of a single file including a header portion 54A and page portion 54B, as shown in FIG. 7. As shown in FIG. 8, information on a print sheet is described in the header portion 54A. The information on a print sheet includes at least the type and size of the print sheet and includes the quality of the sheet as needed. The type and size of the print sheet is described by a combination of a symbol R, such as R1, R2 or R3, representing a roll sheet and a numeral representing the size of the roll sheet in the case where the print sheet is the roll sheet, and is described as, for example, A4 or B5, in the case where the print sheet is a single sheet.

Described in the page portion 54B are a command "DrawPicture" to command drawing of an image and a command "DrawFrame" to command drawing of a layout frame. The ID (PhotoID) of image data is associated with position information in the command "DrawPicture". A layout frame name (frame name) is associated with position information in the command "DrawFrame". The position information designates the coordinates of two points to thereby specify a rectangular area containing the two points as diagonally opposite vertexes.

FIG. 9 shows a print layout according to the form information 54 shown in FIG. 8. In the case of the print layout shown in FIG. 9, image data whose PhotoID is "1" is printed in a rectangular area Z1 specified by a point (X1, Y1) and a point (X2, Y2). Image data whose PhotoID is "2" is printed in a rectangular area Z2 specified by a point (X3, Y3) and a point (X4, Y4). Image data whose PhotoID is "3" is printed in a rectangular area Z3 specified by a point (X5, Y5) and a point (X6, Y6).

Figure 10:
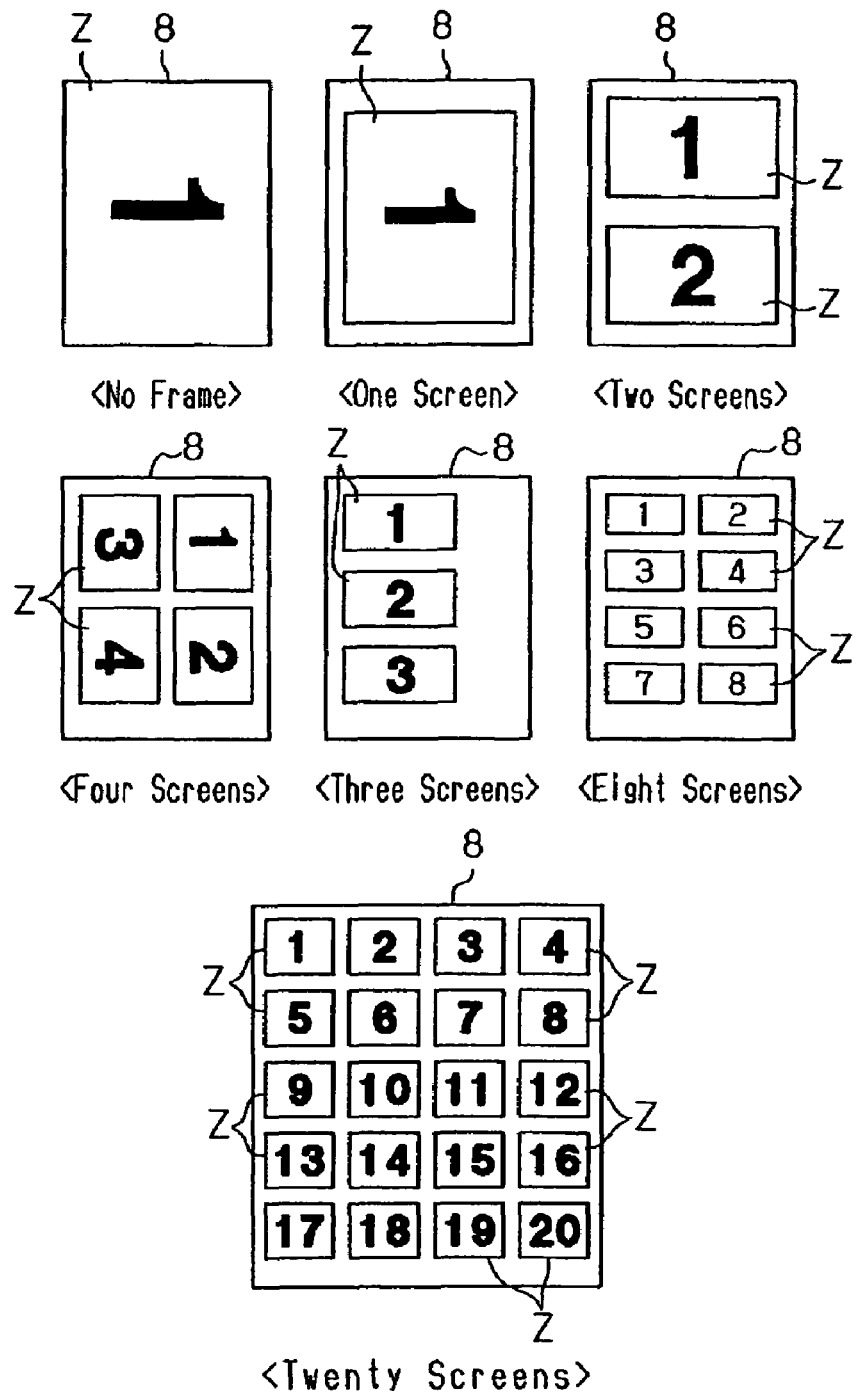
FIG. 10 is a diagram exemplifying a default print layout.

A default print layout is stored in the ROM 27. The default print layout includes, for example, a single-frame print to print only a single piece of image data on a single sheet, a plural-frame print to print plural pieces of image data on a single sheet, and an index print to print a list of all the pieces of image data stored in the memory card 14. FIG. 10 exemplifies the default print layout. Image data is printed in a rectangular area Z on each sheet 8 shown in FIG. 10. Image data is printed in each rectangular area Z in the order of given numbers as shown in FIG. 10 or in the same direction as the direction of the associated number. There may be two types of 1-frame prints, one with a frame and the other with no frame.

As the user selects image data on the screen 10 of the display unit 11 and depresses the set switch 23, the CPU 25 reads print attribute information associated with the selected image data from the memory card 14. The CPU 25 analyzes the read print attribute information to acquire information such as the number of prints to be made, and the type and size of a sheet and a print layout to be used at the time of printing.

The CPU 25 also reads the selected image data from the memory card 14 with the ID information 51 as a key. The CPU 25 generates layout display data based on the read image data and print attribute information and stores the generated layout display data in the screen memory of the RAM 28. The CPU 25 causes the monitor control section 38 to display the layout frame based on the layout display data stored in the screen memory on the screen 18 of the monitor 17.

Figure 11:
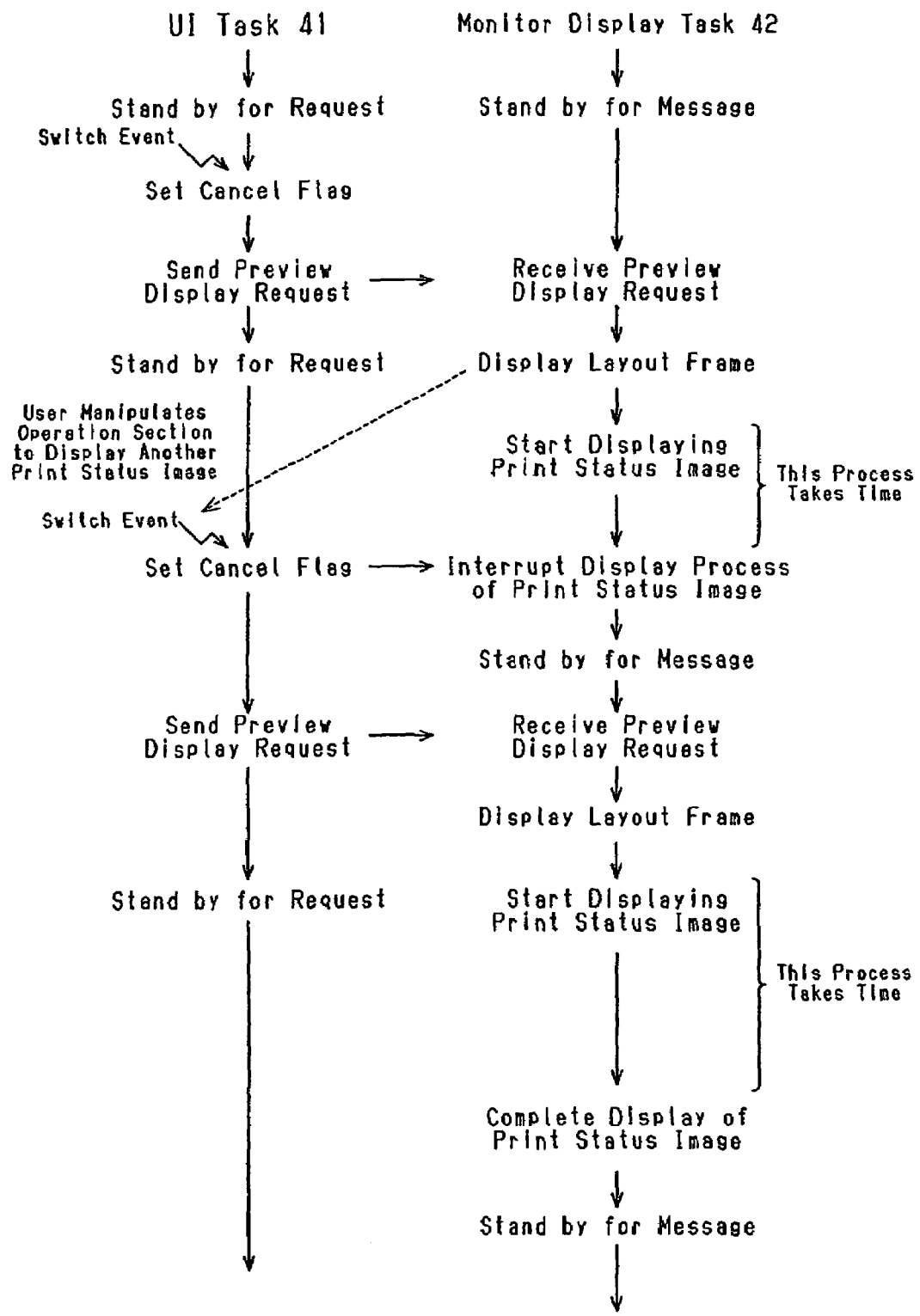
FIG. 11 is a timing chart for processes that are executed by a UI task and a monitor display task.

FIG. 11 illustrates a timing chart for processes that are executed by the UI task and monitor display task. Referring to FIG. 11, the following will describe the flow when a print status image is displayed.

To display a print status image on the screen 18 of the monitor 17, the user depresses the set switch 23. Then, as shown in FIG. 11, a switch event (the preview display request event) is sent to the UI task 41. Upon reception of the switch event, the UI task 41 sets the cancel flag and sends a preview display request to the monitor display task 42. If the cancel flag is set, the monitor display task 42 interrupts a process in action. The monitor display task 42 regularly checks if the cancel flag is set, and, when detecting that the cancel flag is set, resets the set cancel flag.

Upon reception of the preview display request, the monitor display task 42 displays the layout frame on the screen 18 of the monitor 17 via the monitor control section 38. Following the display of the layout frame, the monitor display task 42 displays a print status image in that portion on the screen 18 where the layout frame is displayed.

Suppose that before the display of the print status image is completed, the user depresses the select switch 21 or 22 and then depress the set switch 23 in order to display another print status image on the screen 18. This case frequently occurs when a user displays a print status image to check the layout. In that case, the switch event originated from the depression of the select switch 21 or 22 or the set switch 23 is sent to the UI task 41. Upon reception of the switch event, the UI task 41 sets the cancel flag and sends a new preview display request to the monitor display task 42.

Then, the monitor display task 42 detects that the cancel flag has been set and interrupts the display process for the print status image which is undertaking. The monitor display task 42 receives the new preview display request from the UI task 41, displays the new layout frame on the screen 18 of the monitor 17, then displays the new print status image in that portion of the screen 18 where the layout frame is displayed. As the display of the print status image is completed, the monitor display task 42 stands by for a message.

Figure 12:
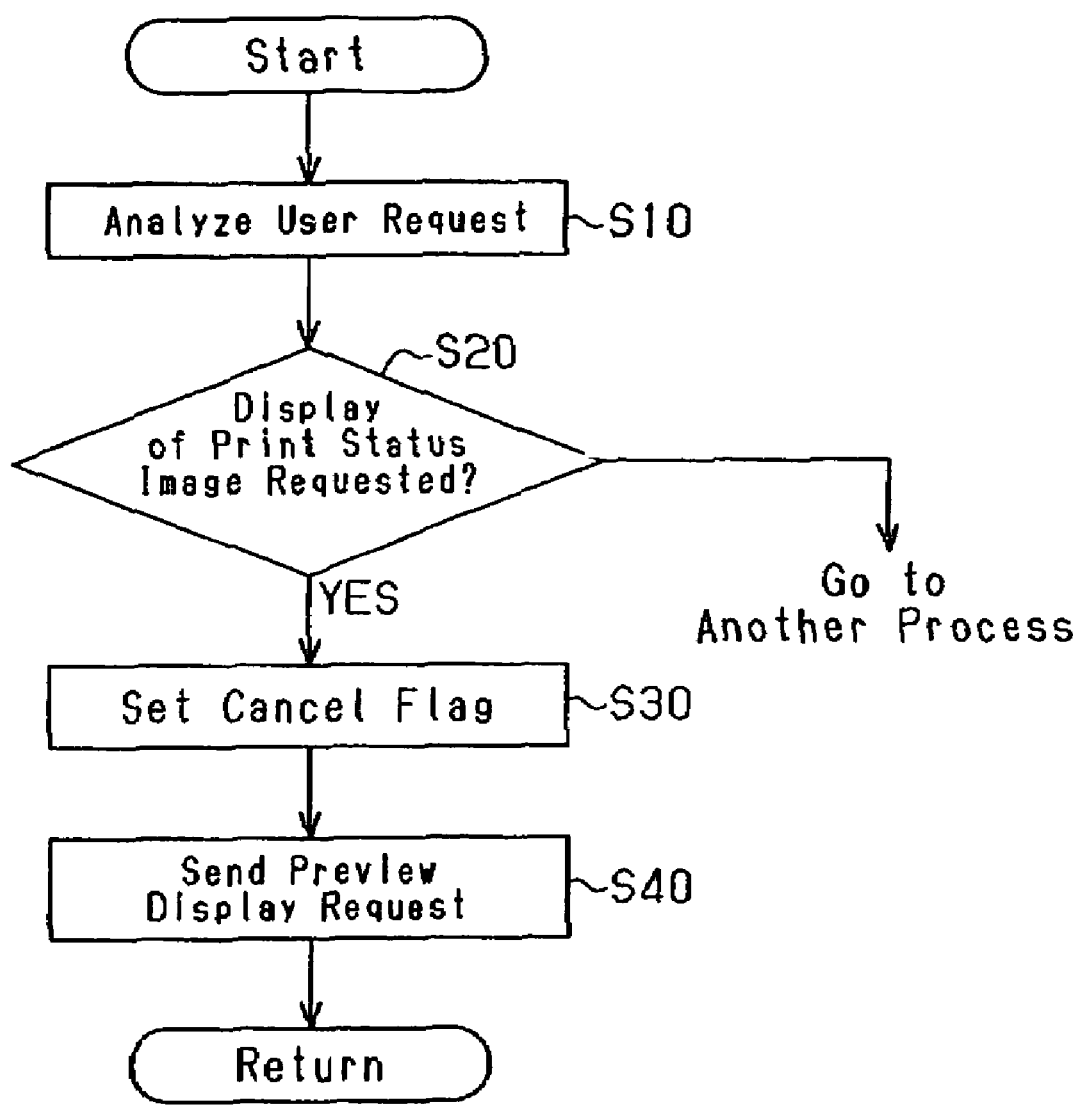
FIG. 12 is a flowchart for the UI task.

FIG. 12 shows a flowchart for the UI task 41. While the operation section 12 is not manipulated, the UI task 41 is standing by for a switch event. Upon reception of a switch event, the UI task 41 is invoked and executes processes according to the flowchart shown in FIG. 12.

In step S10, the UI task 41 having received the switch event analyzes the user request based on the received switch event. In the next step S20, the UI task 41 determines whether or not the user is requesting the display of a print status image. When having determined that the user is requesting the display of a print status image, the UI task 41 proceeds to step S30. When having determined that the user is not requesting the display of a print status image, on the other hand, the UI task 41 goes to another process. This another process is a process other than the process of displaying a print status image on the screen 18 of the monitor 17. In step S30, the UI task 41 sets the cancel flag. That is, the UI task 41 interrupts the process that is being executed by the monitor display task 42. In the next step S40, the UI task 41 sends a preview display request to the monitor display task 42.

Figure 13:
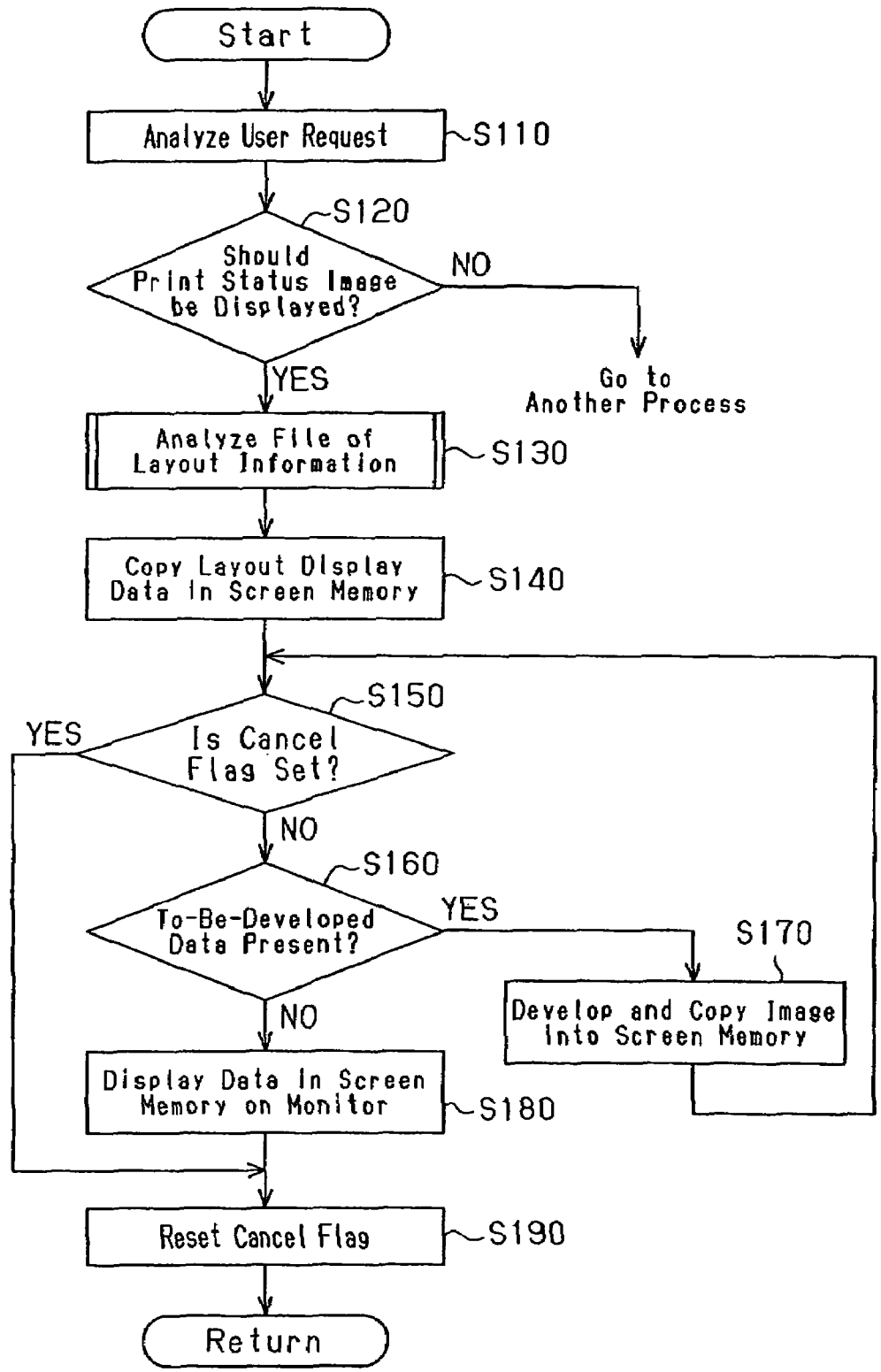
FIG. 13 is a flowchart for the monitor display task.

FIG. 13 illustrates a flowchart for the monitor display task 42. Upon reception of a message from the UI task 41, the monitor display task 42 is invoked and executes processes according to the flowchart shown in FIG. 13.

In step S110, the monitor display task 42 having received the message analyzes the received message. In the next step S120, the monitor display task 42 determines whether the received message is a preview display request or not, i.e., a print status image should be displayed or not. The monitor display task 42 proceeds to step S130 when having determined that the print status image should be displayed, and goes to another process when having determined that the print status image should not be displayed. This another process is a process other than the process of displaying a print status image on the screen 18 of the monitor 17. In step S130, the monitor display task 42 acquires layout information on the layout of a print status image to be displayed and generates layout display data based on the acquired layout information. The details of this step S130 will be given later.

In the next step S140, the monitor display task 42 writes the generated layout display data in the screen memory of the RAM 28 and sends a display request to the monitor control section 38. Upon reception of the display request, the monitor control section 38 reads the layout display data written in the screen memory and displays a layout frame on the screen 18 of the monitor 17. In the subsequent step S150, the monitor display task 42 determines whether the cancel flag is set or not. The monitor display task 42 proceeds to step S160 when having determined that the cancel flag is not set, and proceeds to step S190 when having determined that the cancel flag is set.

In step S160, the monitor display task 42 determines whether or not there is image data to be developed. The monitor display task 42 proceeds to step S170 when having determined that there is image data to be developed and proceeds to step S180 when having determined that there is no image data to be developed. In step S170, the monitor display task 42 develops single to-be-developed image data to an image and copies the developed image data as layout display data in the screen memory. When the development of single to-be-developed image data is completed, the monitor display task. 42 returns to step S150. In step S180, the monitor display task 42 displays the print status image on the screen 18 of the monitor 17 based on the layout display data copied into the screen memory. In step S190, the monitor display task 42 resets the set cancel flag.

Figure 14:
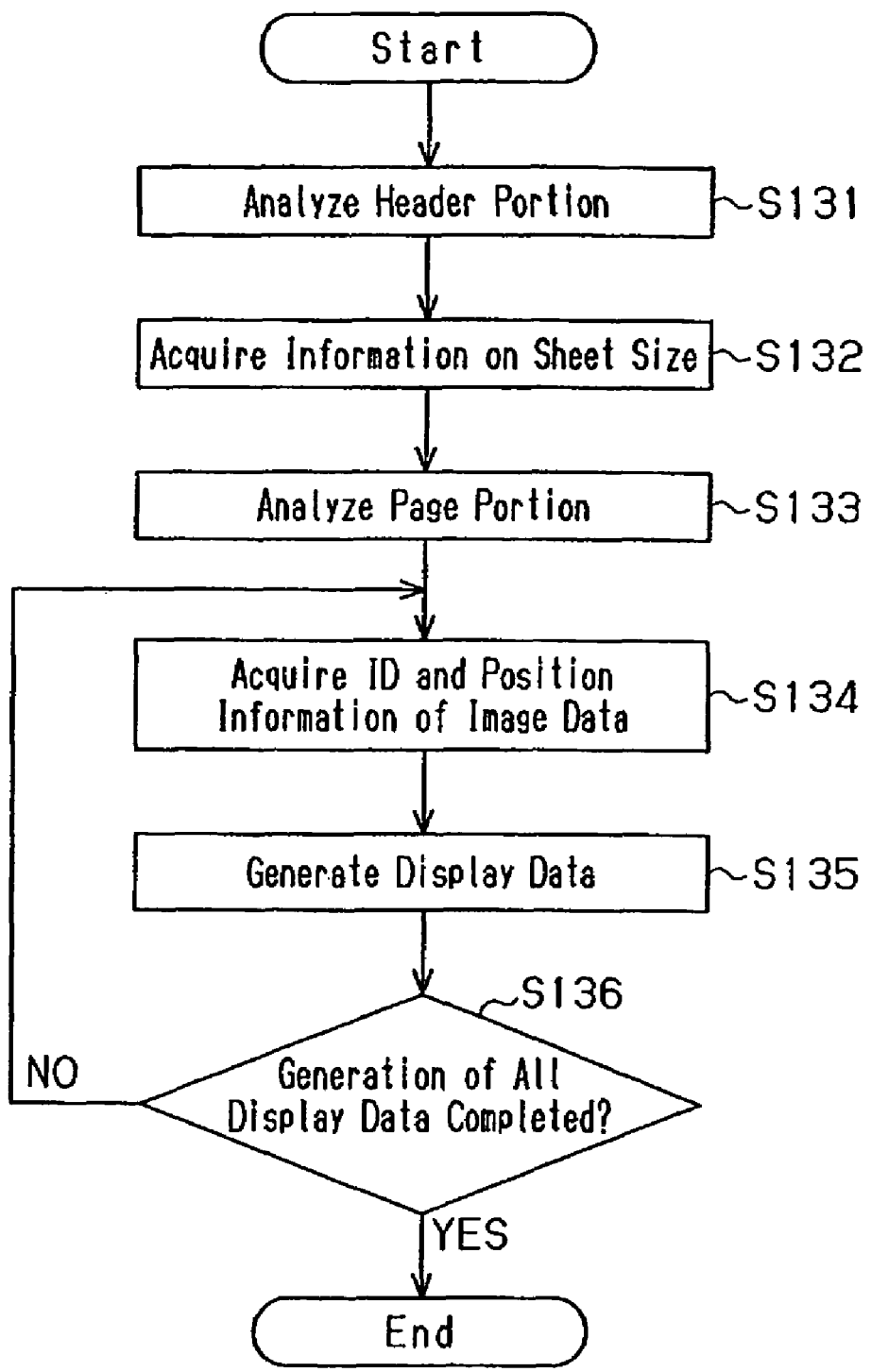
FIG. 14 is a flowchart for a process in step S130 in the monitor display task shown in FIG. 13.

FIG. 14 illustrates a flowchart in the step S130. In step S131, the monitor display task 42 analyzes the header portion 54A (see FIG. 8) of the form information 54 stored in the memory card 14. In the next step S132, the monitor display task 42 acquires information on the print sheet from the header portion 54A. In the subsequent step S133, the monitor display task 42 analyzes the page portion 54B of the form information 54. In the next step S134, the monitor display task 42 acquires the ID and position information of image data to be displayed from the page portion 54B.

In the next step S135, the monitor display task 42 generates layout display data based on the obtained ID and position information of the image data. In the next step S136, the monitor display task 42 determines whether or not generation of the layout display data of every image data to be displayed has been completed. The monitor display task 42 returns to step S134 when the decision is negative and goes to the step S140 shown in FIG. 13 when the decision is affirmative.

The print status of image data is set by the user selectively designating image data and a print condition. This setting can be done by using either a digital camera or the printer 1. If the user has already set the print status of image data using a digital camera, the print status is stored as a part of the form information 54 in the memory card 14.

In the case where the user sets the print status of image data using the printer 1, on the other hand, the user takes the following actions. First, the user loads the memory card 14 into the card slot 16 of the printer 1 and selects "Select image number" on the menu displayed on the screen 10 of the display unit 11. Then, the user selects and settles image data to be printed on a single sheet using the select switches 21 and 22 and the set switch 23. When the selection of image data is completed, the user then selects "Print layout" on the menu on the screen 10. Then, the user selects and settles the desired layout using the select switches 21 and 22 and the set switch 23. To further set the print status of another image data, the user should repeat the above-described manipulation.

To check the set print status, the user selects and settles image data on the screen 10 using the select switches 21 and 22 and the set switch 23. As a result, the print status of the selected image data is displayed on the screen 18 of the monitor 17 as a print status image. Subsequently, as the user selects and settles another image data on the screen 10 of the display unit 11, a new print status image representing the print status of that another image data is displayed, in place of the former print status image, on the screen 18.

Conventionally, a layout could not be checked until the display of a print status image would be completed. Therefore, a user hardly made a manipulation to instruct a next process before completion of the display of a print status image. According to the embodiment, however, a layout frame is displayed first prior to the display of a print status image, so that a user can check the layout without waiting for the display of the print status image to be completed. This can allow the user to make a request to instruct the printer 1 to execute a next process before the display of the print status image is completed. When an operation to instruct a next process is performed on the printer 1 according to the embodiment before the display of a print status image is completed, the display of the print status image is interrupted to accept the operation. Accordingly, the printer 1 can execute the instructed next process.

The first embodiment has the following advantages.

When a user manipulates the operation section 12 to display a print status image on the screen 18 of the monitor 17, the printer 1 first displays a layout frame on the screen 18 and then displays the print status image. The user can therefore check the print layout without waiting for the display of the print status image to be completed.

When a manipulation to instruct a next process is made before the display of the print status image is completed, the display of the print status image is interrupted. This can allow the printer 1 to execute the instructed next process. Therefore, the user can instruct the printer 1 to do a next process of, for example, displaying another print status image on the screen 18 without waiting for the display of the print status image to be completed.

The layout display data is generated based on position information included in the form information 54 as data for a print process. This makes it unnecessary to add new data for the display process.

The second embodiment of the present invention will be discussed next.

In the first embodiment, when the set switch 23 is depressed with image data selected on the screen 10 of the display unit 11, the print status image of the selected image data is displayed on the screen 18 of the monitor 17. According to the second embodiment, by way of contrast, a "preview display mode" selectable using the select switches 21 and 22 is prepared on the screen 10 of the display unit 11.

When a user selects the image number of image data on the screen 10, then selects the "preview display mode" and depresses the set switch 23, the print status image of image data corresponding to the selected image number is displayed on the screen 18 of the monitor 17 first. When the select switch 21 or 22, i.e., the UP switch or DOWN switch, is depressed thereafter, the print status image to be displayed on the screen 18 is switched to the print status image of image data corresponding to the next image number to the selected image number or the print status image of image data corresponding to the previous image number to the selected one. When the UP switch is depressed further, the print status image of image data whose image number is next to the image number that corresponds to the image data of the print status image displayed on the screen 18 is displayed on the screen 18. When the DOWN switch is depressed, on the other hand, the print status image of image data whose image number is previous to the image number that corresponds to the image data of the print status image displayed on the screen 18 is displayed on the screen 18.

There are following two ways to manipulate the select switches 21 or 22 at the time of switching a print status image to be displayed on the screen 18. The first one is to depress the select switch 21 or 22 short in order to change print status images to be displayed one at a time, and the other one is to depress the select switch 21 or 22 long and continuously or to keep depressing the select switch 21 or 22.

When the select switch 21 or 22 is kept depressed, a print status image to be displayed on the screen 18 is switched every predetermined time. This switching is realized by a switch monitor task, the UI task 41 and the monitor display task 42 illustrated in FIG. 16.

Figure 15:
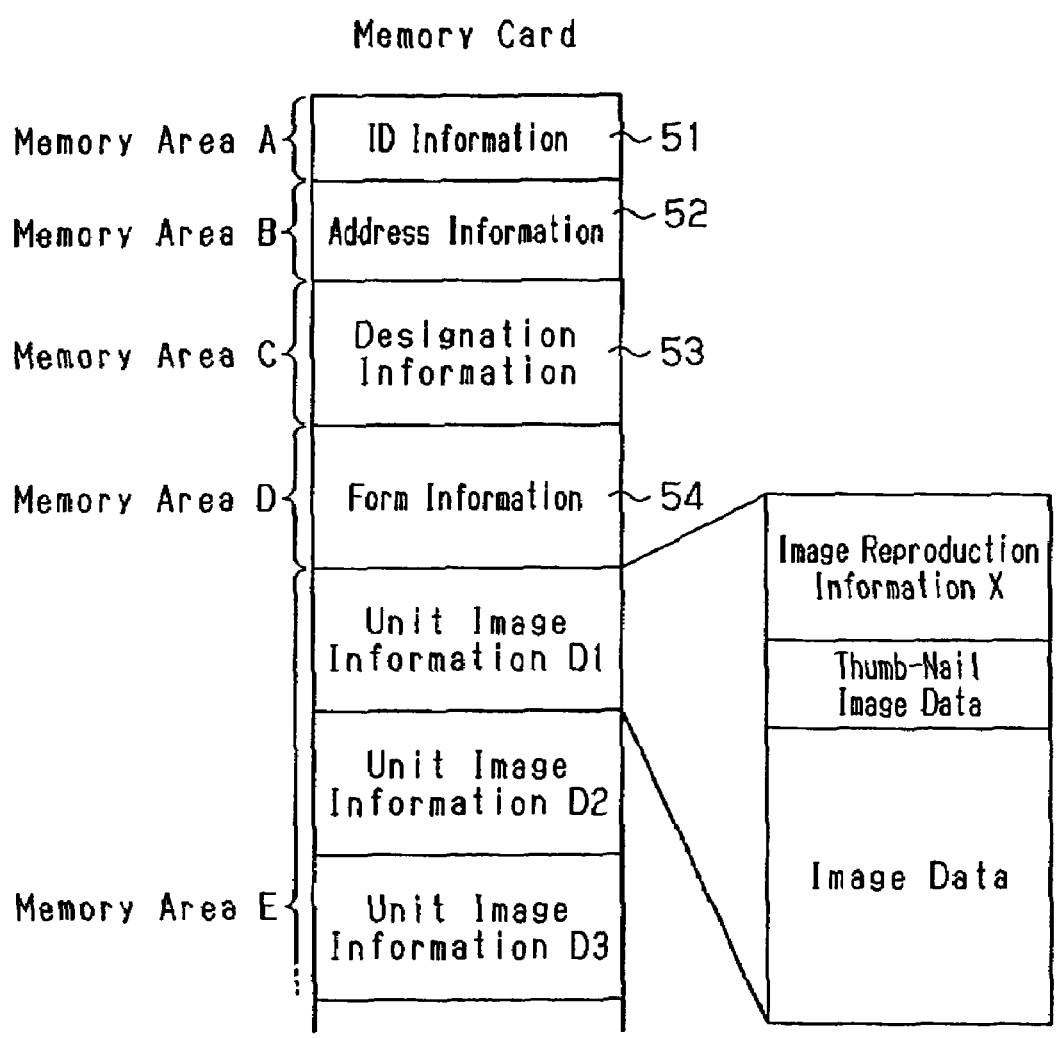
FIG. 15 is a diagram showing the memory map of a memory card according to a second embodiment of the present invention.

FIG. 15 shows the memory map of the memory card 14. Stored in the memory card 14 are the ID information 51, address information 52, designation information 53, form information 54 and unit image information $D_1$ to $D_n$. In this embodiment, each of the unit image information $D_1$ to $D_n$ includes thumb-nail image data in addition to the image reproduction information X and image data. The thumb-nail image data is stored in the memory card 14 by a digital camera which has the capability to automatically generate thumb-nail image data. The amount of thumb-nail image data is smaller than the amount of image data.

In the second embodiment, a print status image includes a thumb-nail image (first print status image) based on thumb-nail image data and a real image (second print status image) based on image data. The resolution of a thumb-nail image is lower than the resolution of its real image. A thumb-nail image is displayed after a layout frame is displayed on the screen 18 of the monitor 17 and in that portion of the screen 18 where its layout frame is displayed. A real image is displayed after the thumb-nail image is displayed on the screen 18 and in that portion of the screen 18 where the thumb-nail image is displayed, in place of the thumb-nail image data. It is to be noted that when the select switch 21 or 22 is kept depressed, the display process for a thumb-nail image is interrupted before the display of the thumb-nail image or the real image is completed.

Figure 16:
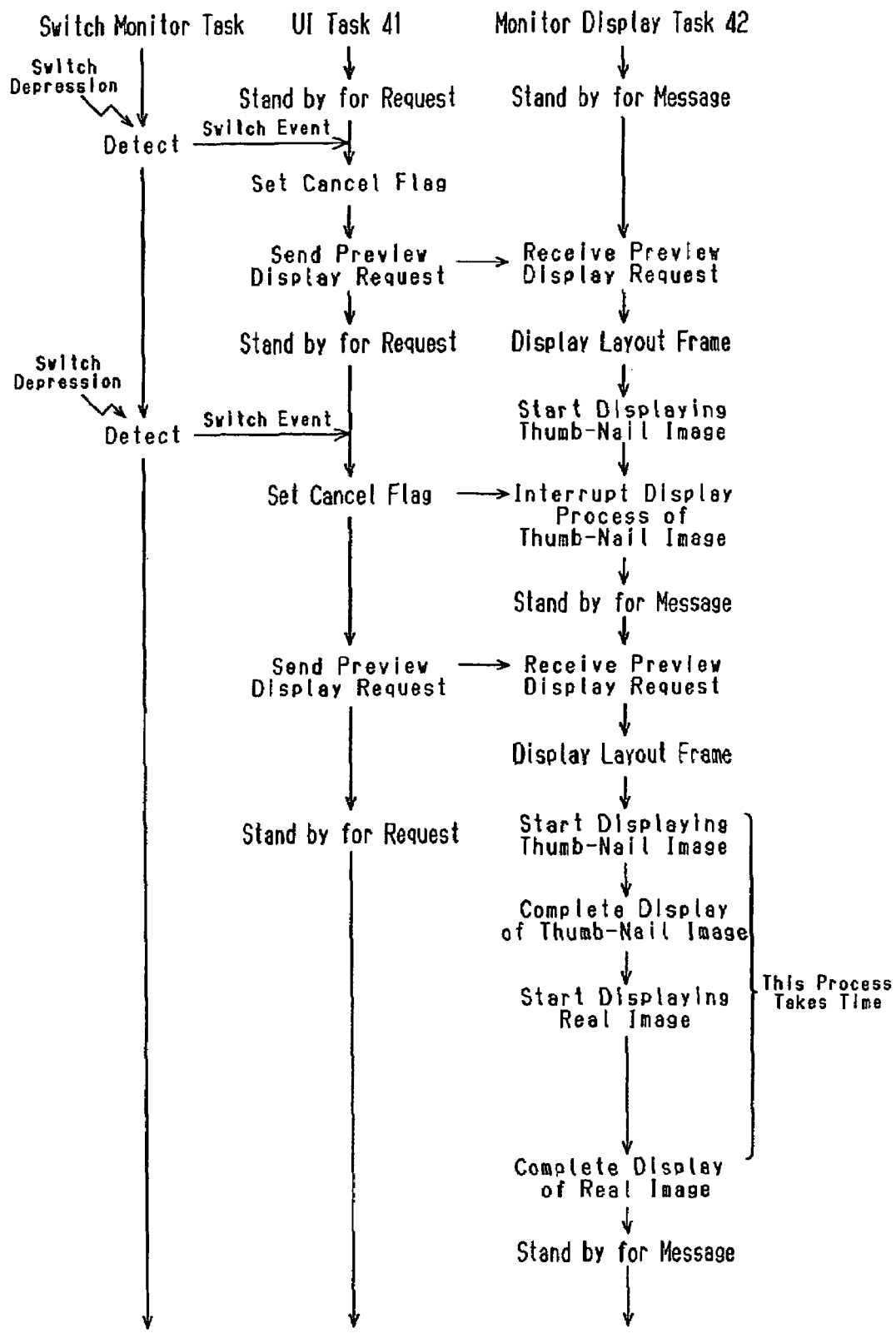
FIG. 16 is a timing chart for processes that are executed by a switching monitor task, a UI task and a monitor display task.

FIG. 16 illustrates a timing chart for processes that are executed by the switch monitor task, the UI task and monitor display task. The switch monitor task regularly checks if the select switch 21 or 22 is depressed. Upon detection of the select switch 21 or 22 being depressed, the switch monitor task sends a switch event to the UI task 41. Upon reception of the switch event, as described in the foregoing description of the first embodiment, the UI task 41 is invoked and analyzes the user request based on the received switch event. When having determined that the user is requesting the display of a print status image, the UI task 41 sets the cancel flag and sends a preview display request to the monitor display task 42 in order to display the print status image on the screen 18. As discussed in the foregoing description of the first embodiment, the monitor display task 42 regularly checks if the cancel flag is set. The monitor display task 42 resumes the undergoing process when the cancel flag is reset, and interrupts the undergoing process when the cancel flag is set. In the case where the select switch 21 or 22 is kept depressed, therefore, the print status image to be displayed on the screen 18 is changed every time the cancel flag is set, i.e., every time the switch monitor task detects the depression of the select switch 21 or 22. The interval to switch the print status image is set longer than the time needed to display a layout frame and is ranges from 50 milliseconds to 100 milliseconds in this embodiment.

Figure 17:
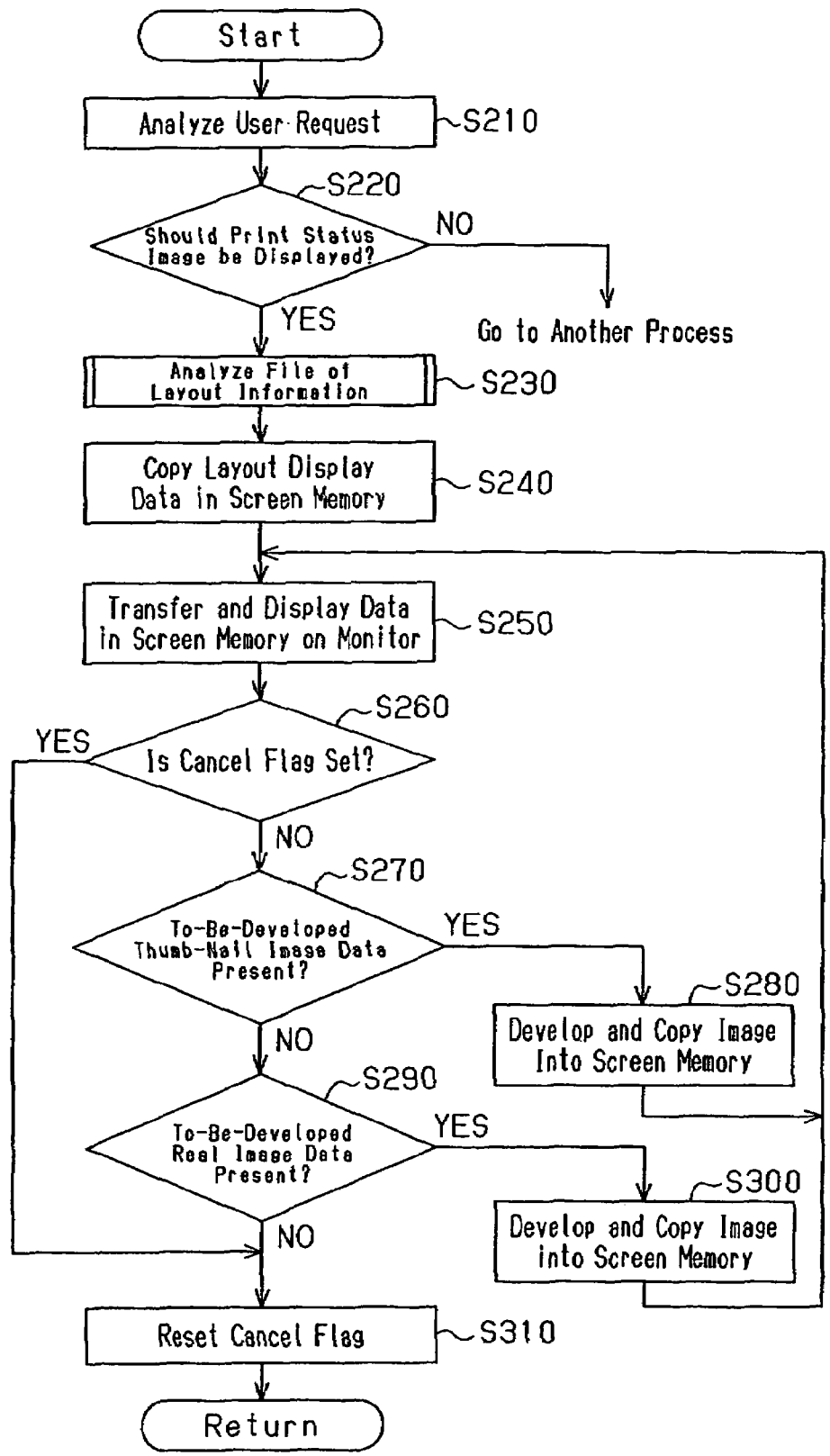
FIG. 17 is a flowchart for the monitor display task according to the second embodiment.
Figure 18:
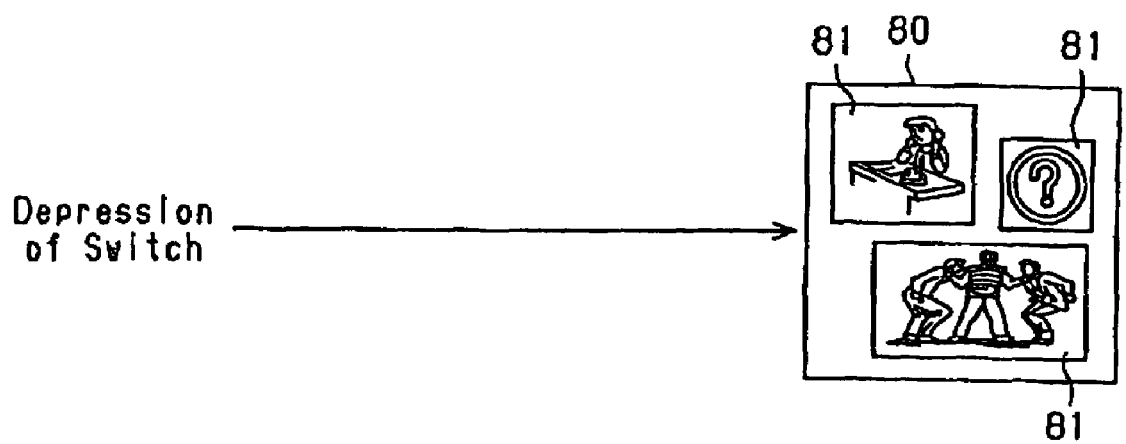
FIG. 18 is a diagram for explaining print status images to be displayed on the monitor screen according to the prior art.

FIG. 17 illustrates a flowchart for the monitor display task 42. Upon reception of a message from the UI task 41, the monitor display task 42 is invoked and executes processes according to the flowchart shown in FIG. 17.

In step S210, the monitor display task 42 having received the message analyzes the received message. In the next step S220, the monitor display task 42 determines whether the received message is a preview display request or not, i.e., a print status image should be displayed or not. The monitor display task 42 proceeds to step S230 when having determined that the print status image should be displayed, and goes to another process when having determined that the print status image should not be displayed. This another process is a process other than the process of displaying a print status image on the screen 18 of the monitor 17.

In step S230, the monitor display task 42 acquires layout information on the layout of a print status image to be displayed and generates layout display data based on the acquired layout information. The details of this step S230 are the same as the details of step S130 shown in FIG. 14.

In the next step S240, the monitor display task 42 writes the generated layout display data in the screen memory of the RAM 28. In the next step S250, the monitor display task 42 sends a display request to the monitor control section 38. Upon reception of the display request, the monitor control section 38 reads the layout display data written in the screen memory and displays a layout frame on the screen 18 of the monitor 17.

In the subsequent step S260, the monitor display task 42 determines whether the cancel flag is set or not. The monitor display task 42 proceeds to step S270 when having determined that the cancel flag is not set, and proceeds to step S310 when having determined that the cancel flag is set.

In step S270, the monitor display task 42 determines whether or not there is thumb-nail image data to be developed. The monitor display task 42 proceeds to step S280 when having determined that there is thumb-nail image data to be developed and proceeds to step S290 when having determined that there is no thumb-nail image data to be developed.

In step S280, the monitor display task 42 develops single to-be-developed thumb-nail image data to an image and copies the developed thumb-nail image data as preview display data in the screen memory. When the development of single to-be-developed thumb-nail image data is completed, the monitor display task 42 returns to step S250. The developed thumb-nail image data is displayed as a thumbnail image in that portion of the screen 18 where the layout frame is displayed in step S250.

In the embodiment, the process of step S260 is executed in an interval equal to or shorter than the interval over which the switch monitor task checks the depression of the select switch 21 or 22. As the UI task 41 sets the cancel flag, therefore, the monitor display task 42 immediately detects the event and can promptly stop the process of displaying a print status image.

In step S290, the monitor display task 42 determines whether or not there is image data to be developed. The monitor display task 42 proceeds to step S300 when having determined that there is image data to be developed and proceeds to step S310 when having determined that there is no image data to be developed.

In step S300, the monitor display task 42 develops single to-be-developed image data to an image and copies the developed image data as preview display data in the screen memory. When the development of single to-be-developed image data is completed, the monitor display task 42 returns to step S250. In step S250, the monitor display task 42 displays a real image, in place of the thumb-nail image, in that portion of the screen 18 where the layout frame is displayed. In step S310, the monitor display task 42 resets the set cancel flag.

The process of step S260 may be omitted. In this case, a cancel-flag check task which determines every predetermined time whether or not the cancel flag is set is prepared. When detecting that the cancel flag is set, the cancel-flag check task sends an interruption event to the monitor display task 42. Upon reception of the interruption event, the monitor display task 42 interrupts the undergoing process.

When the user selects the "preview display mode" on the screen 10 of the display unit 11 and depresses the set switch 23, the print status image of the then selected image data is displayed on the screen 18 of the monitor 17 first. At this time, when the select switch 21 or 22 is depressed once, the print status image of another image data is displayed on the screen 18. When the select switch 21 or 22 is kept depressed long, on the other hand, the print status image to be displayed on the screen 18 is switched one after another.

The flow of the process when the UP switch, one of the select switches 21 and 22, is kept depressed will be described along the flow illustrated in FIG. 16. When the UP switch is kept depressed, the switch monitor task detects the depression of the UP switch every predetermined time (e.g., 50 to 100 milliseconds). Every time the switch monitor task detects the depression of the UP switch, the switch monitor task sends a switch event to the UI task 41.

Every time the UI task 41 receives the switch event originated from the depression of the UP switch, the UI task 41 sets the cancel flag and sends a preview display request to the monitor display task 42. Accordingly, the monitor display task 42 starts the display process to display a new print status image on the screen 18 of the monitor 17 every predetermined time.

Although it is illustrated in FIG. 16 that when the select switch 21 or 22 is kept depressed, the switch monitor task detects the depression of the UP switch only twice, the depression of the UP switch is actually detected five times to several tens of times in accordance with the depression time.

In this connection, a CPU installed in an ordinary printer takes about 0.05 second or less to display a layout frame, takes about 0.3 to 0.6 second to display a thumb-nail image, and takes about 1 to 3 seconds to display a real image. Those times however depend on the amount of data.

In the case where the select switch 21 or 22 is kept depressed, the print status image that is to be displayed on the screen 18 is switched every predetermined time. According to the image display technique described in Patent Document 1, a thumb-nail image is switched to a next image every time about 1 second, which is the sum of the display time of about 0.5 second and the standby time of about 0.5 second, elapses. To display an image located 50 images ahead, therefore, about 50 seconds are needed. According to the embodiment, by way of contrast, in the case where the time interval for detecting the manipulation of a switch is set to, for example, 100 milliseconds, an image located 50 images ahead is displayed if the select switch 21 or 22 is kept depressed for about 5 seconds.

The CPU 25 of the printer 1 executes a plurality of tasks including a display process task to display an image on the screen 18 of the monitor 17 and a print process task. The display process task includes the UI task 41 and the monitor display task 42. The print process task includes an image data conversion task and print control task. Even when the user instructs the display of a print status image, if the CPU 25 is executing the print process task then, the start of the process of displaying the print status image is delayed until the print process task is finished. According to the embodiment, however, because switching of a print status image to be displayed on the screen 18 is very fast, if the process associated with the switching is slightly delayed due to the execution of the print process task, the delay hardly matters.

The second embodiment has the following advantages in addition to the advantages of the first embodiment.

When the select switch 21 or 22 is kept depressed, the display process to display a print status image on the screen 18 is interrupted and the display process to display another print status image instead is initiated. Therefore, the user can reach the print status image to be checked quicker by keeping depressing the select switch 21 or 22.

The CPU 25 executes both a task for displaying an image and the print process task. When the select switch 21 or 22 is kept depressed, however, the print status image displayed on the screen 18 is changed quickly.

The second embodiment may be modified as follows.

Print attribute information is not limited to the type that is stored for a printing purpose in a memory section, such as the memory card 14 or flash memory 29. That is, print attribute information may be stored in the memory section for the purpose of displaying a print status image, not for a printing purpose.

An image (layout position image) which is displayed on the screen 18 prior to the display of a print status image is not limited to a layout frame. For example, the image may be a figure having a predetermined shape, such as a layout frame whose inside area is filled up with some color, like blue, gray or black, i.e., it may be a schematic figure.

A trigger to display a print status image is not limited to the manipulation of the set switch 23 or the select switch 21 or 22 but may be the manipulation of another switch.

The operation panel 3 may be of a touch-panel type in which the switches provided on the touch-panel type operation panel trigger the display of a print status image.

The print layout that can be set on the printer 1 is not limited to the default one. Print layouts other than the default one may be set by the user operating the operation panel 3.

Although the select switch 21 or 22 needs to be kept depressed at the time of continuously switching a print status image to be displayed on the screen 18 in the second embodiment, the structure may be modified in such a way that a print status image is continuously switched without keeping depressing the select switch 21 or 22. When the select switch 21 or 22 is continuously depressed for a predetermined time (e.g., 1 to 2 seconds), for example, the switching of the print status image continues thereafter even if the depression of the select switch 21 or 22 is stopped. In this case, for example, the CPU always set the cancel flag when detecting that select switch 21 or 22 is continuously depressed for a predetermined time or longer. In other words, the CPU is set to a mode to automatically switch a print status image. When the select switch is depressed again, the mode set in the CPU is released.

The embodiment may be constructed in such a way that when the select switch is continuously depressed, the speed to switch the print status image becomes gradually faster. When the time over which the select switch is continuously depressed exceeds a given time (e.g., 1 second), the time interval (initially set to, for example, 50 to 200 milliseconds) over which the switch monitor task checks the depression of the select switch may become shorter gradually (e.g., 20 to 50 milliseconds). It is however desirable that the time interval to check the depression of the select switch should always be longer than the time needed to display a layout frame. According to this modification, when a print status image to be displayed is located further ahead, for example, the user can display the print status image to be displayed earlier by keeping depressing the switch.

In the second embodiment, when the depression of the select switch 21 or 22 is detected before completion of the display of a layout frame, the process may be shifted to the display process for a layout frame for another print status image after the display of the former layout frame is completed.

Although there are plural print status images to be displayed on the screen 18 of the monitor 17 per screen in each embodiment discussed above, a single print status image may be displayed.

The layout display data is generated based on the layout information acquired from the form information in the embodiments, the layout display data may be stored in the memory card 14 or ROM beforehand.

In the second embodiment, the time interval to determine whether or not the select switch 21 or 22 is depressed may be set in such a way that the decision on the depression of the select switch 21 or 22 is made at a timing which comes after the display of the layout frame on the screen 18 and before the initiation of the display of the print status image on the screen 18 (or before the initiation of a process needed to display the print status image). This modification permits only layout frames to be displayed one after another without performing the display of the print status image or the process necessary for that display, when the select switch 21 or 22 is kept depressed.

Alternatively, a decision may be made on whether or not the select switch 21 or 22 is continuously depressed (i.e., whether or not the select switch 21 or 22 is kept depressed) in which only layout frames are displayed one after another without performing the display of the print status image or the process necessary for that display, when it is decided that the continuous depression of the select switch 21 or 22 has taken place. The decision of whether or not the select switch 21 or 22 is continuously depressed is made as follows, for example. In the case where the depression of the select switch 21 or 22 was detected in both the previous detection and the current detection at the time of detecting the status of the select switch 21 or 22 in a given time interval, it is decided that the select switch 21 or 22 is continuously depressed. Alternatively, it may be decided that the select switch 21 or 22 is continuously depressed when the time over which the select switch 21 or 22 is depressed exceeds a predetermined time.

Instead of making a decision on whether or not the select switch 21 or 22 is continuously depressed every predetermined time interval, it may be determined whether or not the select switch 21 or 22 is depressed immediately after a layout frame is displayed on the screen 18 and, when the select switch 21 or 22 is depressed, the process may not go to the process of displaying a print status image but may immediately go to the display process for a layout frame for another print status image.

In the second embodiment, the monitor display task 42 may display a real image (high-resolution image) corresponding to a thumb-nail image (low-resolution image) without displaying a layout frame, after displaying the thumb-nail image. That is, when the set switch 23 (operation section) is operated to instruct the display of an image on the screen, a thumb-nail image with a low resolution is displayed on the screen first, followed by the display of a real image with a high resolution. In the case where the set switch 23 is depressed during each display process, the display process may be interrupted and go to a process for another thumb-nail image, or in the case where the set switch 23 is kept depressed, the display process may be interrupted and go to a process for another thumb-nail image as done in the second embodiment.

Although the present invention is adapted to a stand-alone type printer in the embodiments, the present invention may be adapted to other types of printers as well. For example, the present invention may be adapted to a case where an external memory device is connected to a printer to extend the functions, so that at the time of making a print based on image data read from the external memory device, the printer executes such a display process as to display a print image for a preview purpose on the monitor provided on the printer. Further, the printer is not limited to an ink-jet type but may be another type of printer, such as a laser printer. The printing apparatus should have only the printing capability so that the present invention can be adapted to a complex machine which has multiple functions, such as FAX capability and copy capability.

Although two embodiments of the present invention and their modifications have been described herein, it should be apparent to those skilled in the art that the present invention may be embodied in many other specific forms without departing from the spirit or scope of the present invention. The present invention is not to be limited to the details given herein, but may be modified within the scope and equivalence of the appended claims.

The invention claimed is:

1. A display control method comprising the stages of:
   creating a plurality of print status images based on image data, each print status image representing a print status of corresponding image data on a print medium; and
   displaying layout position images on a monitor one after another every time predetermined time elapses in response to continuous pushing operation of an operation section that is operated to give an instruction to the monitor, each layout position image representing a layout of an image in a corresponding one of the print status images, wherein following completion of displaying one of the layout position images on the monitor, a process for displaying on the monitor one or more images to be laid out corresponding to the displayed layout position image is started and continued only until the next layout position image starts to be displayed on the monitor as a result of the continuous pushing operation, wherein the process for displaying one or more images is interrupted on the way even if the process for displaying one or more images is not completed when the predetermined time elapses, wherein when the continuous pushing operation of the operation section is stopped, the process for displaying on the monitor one or more images to be laid out corresponding to the layout position image that is displayed on the monitor is continued until the display of the one or more images to be laid out is completed.

2. A display control apparatus comprising:

an interface configured to receive an input of image data;

a control section configured to create a plurality of print status images based on the input image data, each print status image representing a print status of corresponding image data on a print medium, an operation section; and a monitor configured to display layout position images one after another every time predetermined time elapses in response to continuous pushing operation of the operation section, each layout position image representing a layout of an image in a corresponding one of the print status images, wherein following completion of displaying one of the layout position images on the monitor, the monitor starts and continues a process for displaying one or more images to be laid out corresponding to the displayed layout position image only until the monitor starts to display the next layout position image as a result of the continuous pushing operation, wherein the monitor interrupts the process for displaying on or more images on the way even if the process for displaying one or more images is not completed when the predetermined time elapses, wherein when the continuous pushing operation of the operation section is stopped, the control section controls the monitor to continue the process for displaying one or more images to be laid out corresponding to the layout position image that is displayed on the monitor until the display of the one or more images to be laid out is completed.

3. The display control apparatus according to claim 2, wherein each of said layout position images includes a figure having a predetermined shape.

4. The display control apparatus according to claim 2, wherein each of said layout position images is displayed in that portion of said monitor where said image is to be displayed in such a way as to frame that portion.

5. The display control apparatus according to claim 2, wherein each of said print status images includes a low-resolution image and a high-resolution image, wherein said high-resolution image is displayed following said low-resolution image.

6. The display control apparatus according to claim 2, further comprising a read section for reading image data and attribute information relating to said image data from a memory medium in which said image data and said attribute information are stored, wherein said attribute information includes layout information relating to the layout of said image and wherein said control section controls display on said monitor in such a way as to display said layout position images and said print status images on said monitor based on said attribute information and said image data read by said read section.

7. The display control apparatus according to claim 2, further comprising a memory section where attribute information relating to said image is stored, wherein said attribute information includes layout information relating to the layout of said image and wherein said control section controls display on said monitor in such a way as to display said layout position images and said print status images on said monitor based on said attribute information read from said memory section and image data.

8. The display control apparatus according to claim 2, wherein said display control apparatus is adapted to a printing apparatus, wherein said control section includes a single CPU which can execute a plurality of tasks including at least a display task and a print task, and wherein the display task relates to display of said layout position images and said print status images.

* * * * *